United States Patent
Ichikawa et al.

(10) Patent No.: US 6,945,726 B2
(45) Date of Patent: Sep. 20, 2005

(54) REFILL FOR OIL-BASED INK BALLPOINT PEN AND OIL-BASED INK BALLPOINT PEN

(75) Inventors: Syuji Ichikawa, Yokohama (JP); Takayuki Ikai, Yokohama (JP); Miyuki Shouji, Yokohama (JP); Daisen Katou, Yokohama (JP); Takeshi Kobayashi, Yokohama (JP)

(73) Assignee: Mitsubishi Pencil Co. Ltd., Tokyo (JP)

(*) Notice: Subject to any disclaimer, the term of this patent is extended or adjusted under 35 U.S.C. 154(b) by 0 days.

(21) Appl. No.: 10/935,706

(22) Filed: Sep. 8, 2004

(65) Prior Publication Data

US 2005/0123341 A1 Jun. 9, 2005

(30) Foreign Application Priority Data

Sep. 8, 2003 (JP) ........................................ 2003-315908
Sep. 8, 2003 (JP) ........................................ 2003-315909

(51) Int. Cl.[7] .............................................. B43K 23/08

(52) U.S. Cl. ....................................... 401/213; 401/209

(58) Field of Search ................................ 401/208, 209, 401/213, 247, 243; 106/31.52, 31.49, 31.58, 31.59

(56) References Cited

U.S. PATENT DOCUMENTS 5,762,435 A * 6/1998 Fukushima ................. 401/213
5,957,608 A * 9/1999 Matsumoto et al. ........ 401/202

FOREIGN PATENT DOCUMENTS

| JP | 53-85623 | 7/1978 |
| JP | 57-178798 | 11/1982 |
| JP | 07-309094 | 11/1995 |
| JP | 2000-043476 | 2/2000 |
| JP | 2002-370491 | 12/2002 |

* cited by examiner

Primary Examiner—David J. Walczak
(74) Attorney, Agent, or Firm—Burns Doane Swecker & Mathis (57) ABSTRACT

A refill for an oil-based ink ballpoint pen which inhibits starving at the beginning of writing and protects a pen point and which inhibits an ink solvent from absorbing moisture from the outside and volatilizing with the passage of time and is excellent in making writing feeling soft and smooth. The refill for an oil-based ink ballpoint pen includes a volatilization-inhibiting seal member, for example, a sealing coat prepared by melting and solidifying an olefin base thermoplastic sticking agent is formed at the point part a tip of a refill for an oil-based ink ballpoint pen charged with a volatile oil-based ink having a specific physical property. The refill can be charged into a defined oil-based ink ballpoint pen.

6 Claims, 7 Drawing Sheets

REFILL FOR OIL-BASED INK BALLPOINT PEN AND OIL-BASED INK BALLPOINT PEN

TECHNICAL FIELD

The present invention relates to a refill for an oil-based ink ballpoint pen and an oil-based ink ballpoint pen, more specifically to a refill for an oil-based ink ballpoint pen and an oil-based ink ballpoint pen which inhibit starving at the beginning of writing after transportation and storage and which protect a pen tip and inhibit an ink solvent from absorbing moisture from the outside and volatilizing with the passage of time and are excellent in making writing feeling soft and smooth.

BACKGROUND ART

When a ballpoint pen is sold in the form of a refill, a sealing coat has so far been formed at the point part of the tip by melting and solidifying a thermoplastic sticking agent for the purposes of preventing volatilization from the point part of the tip and drying, preventing an ink from leaking onto a surface with which the pen point is brought into contact, avoiding oxidation of the ink and metal members such as the tip which is exerted from the outside and protecting the point part of the tip from impact in the stages of transportation and distribution.

In particular, in the case of a water-based ink ballpoint pen, a sealing coat has been formed principally because of the reasons described above, but in the case of an oil-based ink ballpoint pen, no specific problems are involved in prevention of volatilization from the point of the tip because a mixed solvent of 2-phenoxyethanol and benzyl alcohol which have a low volatility is usually used, and therefore in general, a sealing coat is formed or not formed depending on a diameter of a ball.

Known as conventional sealing coats for a point part of a ballpoint pen tip are a sealing coat comprising an ethylene-vinyl acetate copolymer (EVA) as a thermoplastic sticking agent (Japanese Patent Application Laid-Open No. 85623/1978) and a sealing coat comprising a cellulose base polymer (Japanese Patent Application Laid-Open No. 178798/1982).

On the other hand, oil-based inks which are excellent in a writing performance and a drying property of drawn lines and do not cause strike-through, and which have not so far been available, have been developed in recent years by combining various solvents.

The above oil-based inks are volatile inks and have a problem on a sealing property at the point part of the tip because a solvent component and the like are liable to be volatilized from the point of the tip when a conventional sealing coat is used, and the problems that starving is caused at the beginning of writing and that writing feeling is damaged are brought about in a certain case.

There have already been known cap members having various structures which comprise a cap main body detachably fit on a tip side of a refill (ballpoint pen main body) for a ballpoint pen charged with a water-based ink for a ballpoint pen or a water-based gel ink for a ballpoint pen and a sealing member provided in the inside of the above cap main body, wherein the cap member is formed so that the sealing member described above covers the point of the tip when the above cap main body is mounted on the tip side of the ballpoint pen main body.

A water-based ink ballpoint pen and a water-based gel ink ballpoint pen are liable to be dried at a point of a tip as compared with an oil-based ink ballpoint pen, and a solvent component and the like are liable to be volatilized from the point of the tip, so that the point of the tip has to be covered with a sealing member.

Known as a water-based ink ballpoint pen having such structure as described above is, for example, a ballpoint pen in which a nitrile rubber having a Shore A hardness of Hs 5 to 36 is used as a sealing rubber for the cap member described above (for example, Japanese Patent Application Laid-Open No. 370491/2002 filed by the present applicant).

However, the cap member described in the foregoing document is used only for conventional water-based ink ballpoint pens and is not used for oil-based ink ballpoint pens having different ink compositions.

Since a mixed solvent of 2-phenoxyethanol and benzyl alcohol which have a low volatility is usually used in conventional oil-based ink ballpoint pens, no specific problems have been involved in prevention of volatilization from the point of the tip, and therefore the point of the tip does not have to be covered with a sealing member in a cap member.

On the other hand, oil-based inks which are excellent in a writing performance and a drying property of drawn lines and do not cause strike-through, and which have not so far been available, have been developed in recent years by combining various solvents.

The above oil-based inks are volatile inks and have a problem on a sealing property at the point part of the tip because a solvent component and the like are liable to be volatilized from the point of the tip when a conventional sealing coat is used, and the problems that starving is caused at the beginning of writing and that writing feeling is damaged are brought about in a certain case.

In light of the problems on the prior art described above, the present invention intends to solve them, and the first object thereof is to provide a refill for an oil-based ink ballpoint pen which can be surely formed a sealing coat at the point part of a tip without using a principal solvent and a thermoplastic sticking agent each conventionally used for an oil-based ink and inhibits an ink solvent from absorbing moisture from the outside and volatilizing with the passage of time and which inhibits starving at the beginning of writing after transportation and storage, protects a pen point and is excellent in making writing feeling soft and smooth. The second object thereof is to provide an oil-based ink ballpoint pen which inhibits starving at the beginning of writing as well as preventing a solvent from volatilizing from a pen point even if a specific oil-based ink having a volatilizing property is used and which is excellent in making writing feeling soft and smooth.

DISCLOSURE OF THE INVENTION

Intensive investigations repeated by the present inventors in order to solve the conventional problems described above have resulted in finding that a refill for an oil-based ink ballpoint pen which meets the first object described above can be obtained by forming a specific member at the point part of a tip of a refill for an oil-based ink ballpoint pen prepared by charging a refill for a ballpoint pen equipped with a ballpoint pen tip at a point thereof with a volatile oil-based ink containing a solvent having a specific physical property in a specific amount based on the total solvents. Thus, the first invention has come to be completed.

Further, the present inventors have found that an oil-based ink ballpoint pen which meets the second object described above can be achieved by an oil-based ink ballpoint pen that is equipped with a cap main body which is detachable on the tip side of a refill for an oil-based ink ballpoint pen charged with a volatile oil-based ink containing a solvent having a specific physical property and has a specific member in the inside, wherein the specific member is formed so that it covers the point of the tip when the above cap main body is mounted on the tip side of the refill for an oil-based ink ballpoint pen. Thus, the second invention has come to be completed.

That is, the present invention comprises the following items (1) to (5).

(1) A refill for an oil-based ink ballpoint pen prepared by charging a refill for a ballpoint pen equipped with a ballpoint pen tip at a point thereof with a volatile oil-based ink containing at least a solvent selected from the group consisting of alcohols, polyhydric alcohols and glycol monoethers each having a vapor pressure of 0.001 mm Hg or more at 25° C. and having no aromatic ring in a molecular in an amount of 50% by weight or more based on the total solvents, wherein a volatilization-inhibiting seal member is formed at the point part of the tip described above.

(2) An oil-based ink ballpoint pen characterized in that it is equipped with a refill for an oil-based ink ballpoint pen charged with a volatile oil-based ink containing at least a solvent selected from the group consisting of alcohols, polyhydric alcohols and glycol monoethers each having a vapor pressure of 0.001 mm Hg or more at 25° C. and having no aromatic ring in a molecular in an amount of 50% by weight or more based on the total solvents and a cap main body which is detachable on the tip side of the above refill for an oil-based ink ballpoint pen and has a volatilization-inhibiting seal member in the inside thereof, wherein the volatilization-inhibiting seal member is formed so that it covers the point of the tip when the above cap main body is mounted on the tip side of the refill for an oil-based ink ballpoint pen.

(3) A refill for an oil-based ink ballpoint pen, wherein the volatilization-inhibiting seal member as described in the above item (1) is a sealing coat obtained by melting and solidifying an olefin base thermoplastic sticking agent.

(4) An oil-based ink ballpoint pen, wherein the volatilization-inhibiting seal member as described in the above item (2) is constituted from a rubber selected from the group consisting of a butyl rubber (IIR) and ethylene propylene rubbers (EPM, EPDM).

(5) A refill for an oil-based ink ballpoint pen or an oil-based ink ballpoint pen, wherein a solvent represented by the following Formula (I) is used as the glycol monoether as described in the above item (1) or (2):

wherein $R^1$, $R^2$ and $R^3$ each are independently H or $CH_3$.

BEST MODE FOR CARRYING OUT THE INVENTION

The embodiments of the present inventions shall be explained below in details on every invention.

The refill for an oil-based ink ballpoint pen of the first invention is a refill for an oil-based ink ballpoint pen prepared by charging a refill for a ballpoint pen equipped with a ballpoint pen tip at a point thereof with a volatile oil-based ink containing at least a solvent selected from the group consisting of alcohols, polyhydric alcohols and glycol monoethers each having a vapor pressure of 0.001 mm Hg or more at 25° C. and having no aromatic ring in a molecular in an amount of 50% by weight or more based on the total solvents, and it is characterized in that a volatilization-inhibiting seal member is formed at the point part of the tip described above.

The oil-based ink ballpoint pen of the second invention is characterized in that it is equipped with a refill for an oil-based ink ballpoint pen charged with a volatile oil-based ink containing at least a solvent selected from the group consisting of alcohols, polyhydric alcohols and glycol monoethers each having a vapor pressure of 0.001 mm Hg or more at 25° C. and having no aromatic ring in a molecular in an amount of 50% by weight or more based on the total solvents and a cap main body which is detachable on the tip side of the refill for an oil-based ink ballpoint pen and which has a volatilization-inhibiting seal member in the inside thereof, wherein the volatilization-inhibiting seal member is formed so that it covers the point of the tip when the above cap main body is mounted on the tip side of the refill for an oil-based ink ballpoint pen.

In the following, both of the first invention and the second invention are included when referred to as the present invention.

In the present invention, at least one solvent selected from the group consisting of alcohols, polyhydric alcohols and glycol monoethers each having a vapor pressure of 0.001 mm Hg or more at 25° C. has to be used as the principal solvent (50% by weight or more based on the total solvents) used for the volatile oil-based ink charged into the refill for an oil-based ink ballpoint pen.

The present invention has been developed for the purpose of solving the specific problems that when a specific solvent having a high vapor pressure is used, as described above, for an oil-based ink, the solvent component is liable to be volatilized from the point of a tip of a refill for an oil-based ink ballpoint pen and that a sealing property at the point part of the tip is damaged to thereby cause starving at the beginning of writing and damage writing feeling.

Accordingly, when the characteristic described above is not satisfied, that is, when at least one solvent selected from the group consisting of alcohols, polyhydric alcohols and glycol monoethers each having a vapor pressure of 0.001 mm Hg or more at 25° C. accounts for less than 50% by weight or the solvent used has a vapor pressure of less than 0.001 mm Hg at 25° C., such an ink falls outside the scope of the present invention.

In the present invention, the specific alcohols having a vapor pressure of 0.001 mm Hg or more at 25° C. are aliphatic alcohols having 2 or more carbon atoms and include ethanol, n-propanol, isopropanol, n-butanol, isobutanol, tert-butyl alcohol, 1-pentanol, isoamyl alcohol, sec-amyl alcohol, 3-pentanol, tert-amyl alcohol, n-hexanol, methylamyl alcohol, 2-ethylbutanol, n-heptanol, 2-heptanol, 3-heptanol, n-octanol, 2-octanol, 2-ethylhexanol, 3,5,5-trimethylhexanol, nonanol, n-decanol, undecanol, trimethylnonyl alcohol, tetradecanol, heptadecanol, cyclohexanol, 2-methylhexanol and other various higher alcohols.

The polyhydric alcohols having the characteristic described above include polyhydric alcohols having 2 or more carbon atoms and 2 or more hydroxyl groups in a molecule, such as ethylene glycol, diethylene glycol, 3-methyl-1,3-butanediol, triethylene glycol, dipropylene glycol, 1,3-propanediol, 1,3-butanediol, 1,5-pentanediol, hexylene glycol and octylene glycol.

The glycol monoether having the characteristic described above includes ethylene glycol monohexyl ether, ethylene glycol mono-2-ethylbutyl ether, ethylene glycol monomethyl ether, ethylene glycol monoethyl ether, ethylene glycol monobutyl monobutyl ether, diethylene glycol monomethyl ether, diethylene glycol monoethyl ether, diethylene glycol monobutyl ether, triethylene glycol monobutyl ether, tetraethylene glycol monobutyl ether, 3-methyl-3-methoxy-1-butanol, 3-methoxy-1-butanol, propylene glycol monomethyl ether, propylene glycol monoethyl ether, propylene glycol monopropyl ether, propylene glycol monobutyl ether, propylene glycol tertiary butyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monobutyl ether and tetrapropylene glycol monobutyl ether.

The particularly preferred solvent having the characteristic described above includes the solvent represented by the following Formula (I):

wherein $R^1$, $R^2$ and $R^3$ each are independently H or $CH_3$. To be specific, it includes propylene glycol monomethyl ether, 1,3-butanediol, 3-methoxy-1-butanol and 3-methyl-3-methoxy-1-butanol.

Among the solvents given above having the characteristic described above, glycol monoethers having 2 to 7 carbon atoms are particularly preferred in terms of further improving the effects of the present invention. Further, organic solvents other than ethylene glycol derivatives are preferably used from the viewpoint of safety and oral toxicity.

In the present invention, a content of a solvent selected from the group consisting of alcohols, polyhydric alcohols and glycol monoethers each having a vapor pressure of 0.001 mm Hg or more at 25° C. and having no aromatic ring in a molecular is, as described above, 50% by weight or more, preferably 60 to 100% by weight based on the total solvents. This makes it possible to provide an excellent writing performance and a good drying property of drawn lines and prevent strike-through of the lines. Solvents other than the solvents having the characteristic described above may be used in such a range that the content described above is maintained.

A content of the whole solvents including the solvent having the characteristic described above is 20 to 90% by weight, preferably 30 to 80% by weight based on the total amount of the ink.

In addition to the above, a resin, a coloring material, an additive and an ink follower each shown below can be used, if necessary, for the volatile oil-based ink used in the present invention as long as the effects of the present invention are not damaged.

The resin which can be used for the volatile oil-based ink in the present invention includes, for example, resins represented by ketone resins, styrene resins, styrene-acryl resins, terpene phenol resins, rosin-modified maleic acid resins, rosin phenol resins, alkylphenol resins, phenol base resins, styrene maleic acid resins, rosin base resins, acryl base resins, urea aldehyde base resins, maleic acid base resins, cyclohexanone base resins, polyvinylbutyral and polyvinylpyrrolidone.

A content of the above resins is preferably 1 to 30% by weight, more preferably 1 to 20% by weight based on the total amount of the oil-based ink.

If the above content is less than 1% by weight, that makes it difficult to control the viscosity and has an adverse effect on abrasion at the pen point. On the other hand, if it exceeds 30% by weight, the raw materials other than the resin can not be blended or an adverse effect is exerted on the writing performance.

In the present invention, when a pigment is used as the coloring material for the oil-based ink, resins which can disperse the pigment can be selected from the resins given above and used as a dispersant, and any compounds including surfactants and oligomers can be used regardless of the kind thereof as long as they meet the objects of the dispersant.

Capable of being given as the specific dispersant are, for example, synthetic resins such as polyvinyl alcohol, polyvinylpyrrolidone, polyvinylbutyral, polyvinyl ether, styrene-maleic acid copolymers, ketone resins, hydroxyethyl cellulose and derivatives thereof and styrene-acrylic acid copolymers, PO.EO adducts and amine base oligomers.

Further, in the present invention, a pigment or a pigment used in combination with a dye can be used as the coloring material. Capable of being used as the pigment are, for example, carbon black, organic pigments such as, phthalocyanine, azo, quinacridone, diketopyrrolopyrrole, indanthrene, dioxazine. Further, preferred are pigments which are less liable to be dissolved in the organic solvents used and which have an average particle diameter of 30 to 700 nm after dispersing.

The pigment can be added, if necessary, in a content falling in a range of 0.5 to 25% by weight, preferably 0.5 to 20% by weight based on the total amount of the oil-based ink.

The pigments can be used alone or in a mixture of two or more kinds thereof. Also, a dispersed liquid of an inorganic pigment and a dye can be added as well, if necessary, to such an extent that an adverse effect is not exerted on the dispersion stability. Further, capable being used are resin emulsions obtained by polymerizing styrene, acrylic acid, acrylic acid esters, methacrylic acid, methacrylic acid esters, acrylonitrile and olefin base monomers, hollow resin emulsions which are swollen in an ink to become an indefinite form or organic polychromatic pigments comprising dyed resin particles obtained by dyeing the above emulsions themselves with colorants.

In the present invention, when the coloring material used for the oil-based ink is a pigment, a pigment-dispersed ink composition can be produced by employing various methods which have so far conventionally been known. For example, it can readily be obtained by blending the respective components described above and mixing and stirring them by means of a stirrer such as a dissolver or mixing and crushing them by means of a ball mill, a roll mill, a bead mill, a sand mill and a pin mill and then removing coarse particles of the pigment, undissolved matters and mixed solids by centrifugal separation and filtration.

Any dyes can be used in combination with the above pigments without specific restrictions as long as they do not break the dispersion system. Capable of being used as the dyes are optional compounds selected from direct dyes, acid dyes, basic dyes, mordant•acid mordant dyes, spirit-soluble dyes, azoic dyes, sulfur•sulfur vat dyes, vat dyes, disperse dyes, oil-soluble dyes, food dyes and metal complex dyes each used for a usual dye ink composition and inorganic and organic pigments each used for a usual pigment ink composition. A content thereof is selected in a range of 1 to 50% by weight based on the total amount of the oil-based ink.

Further, in the present invention, capable of being added if necessary are a rust preventive, a fungicide, a surfactant, a lubricant and a wetting agent each of which can be compatible with the oil-based ink without exerting an adverse effect. In particular, fatty acid can suitably be used as the lubricant. Also, a non-volatile solvent which is compatible with the principal solvent can be added as an additive for inhibiting dryness as long as an adverse effect is not exerted in terms of the product characteristic.

In the first invention, the refill itself for a ballpoint pen, the shape of the ballpoint pen tip and the structure thereof shall not specifically be restricted as long as a volatilization-inhibiting seal member, to be specific, a sealing coat constituted from an olefin base thermoplastic sticking agent is formed at the point part of the tip in the refill for an oil-based ink ballpoint pen charged with the volatile oil-based ink containing the solvent having the characteristic described above, and it includes, for example, a refill comprising a resin-made or metal-made refill which can be charged with the volatile oil-based ink having the characteristic described above and a ballpoint pen tip member which has a pen point at the point thereof. The refill for an oil-based ink ballpoint pen of the present invention is connected with a barrel and used in the form of an oil-based ink ballpoint pen, for example, an oil-based ink ballpoint pen equipped with a cap and a knock type oil-based ink ballpoint pen without a cap.

In the first invention, after the refill for a ballpoint pen is charged with the oil-based ink having the characteristic described above, an ink follower is preferably further charged into a rear end part of the oil-based ink. The solvent used has the characteristic described above and is volatile, and therefore the ink follower is charged in order to prevent volatilization, moisture absorption and ink leaking.

Low permeability and low diffusibility to the solvent having the characteristic described above are required to the ink follower which can be used, and capable of being used as a base thereof are non-volatile or slightly-volatile fluids, to be specific, non-silicone base oils which are not fundamentally compatible with the solvent having the characteristic described above, such as polybutene and liquid paraffin. When the above substances have a low viscosity, a thickener and a gelatinizer are advisably used. To be specific, they include metallic soaps, bentonites, fatty aid amides, hydrogenated castor oils, metal fine particles containing titanium oxide, silica and alumina, celluloses and elastomers.

In the first invention, a volatilization-inhibiting seal member, to be specific, a sealing coat obtained by melting and solidifying an olefin base thermoplastic sticking agent can be formed at the point part of the tip of the refill for a ballpoint pen charged with the volatile oil-based ink containing the solvent having the characteristic described above. The above volatilization-inhibiting seal member (sealing coat) coated the whole of the point part of the tip makes it possible to surely form the sealing coat at the point part of the tip and makes it possible to inhibit absorption of moisture from the outside into the ink solvent and volatilization thereof with the passage of time, inhibit starving at the beginning of writing after transportation and storage, protect the pen point and make writing feeling soft and smooth.

In the present invention, the olefin base thermoplastic sticking agent used for forming (installing) the sealing coat includes, for example, sticking agents which are usually commercially available as an olefin base sticking agent (or adhesive).

To be specific, they include XH254-1, XH494-3, XH850-2 and the like which are a Hi-bon series manufactured by Hitachi Kasei Polymer Co., Ltd., an Asahi melt series manufactured by Asahi Chemical Synthetic Co., Ltd., a Bond series manufactured by Konishi Co., Ltd. and a Toyo Melt series manufactured by Toyo Petrolite Co., Ltd.

In respect to a content of the olefin base thermoplastic sticking agent used in the first invention, it is prepared by using an olefin base thermoplastic resin for the base resin and solidifying it with a molten mixture comprising a stickness-providing resin and a wax as principal components, and various additives such as a plasticizer, an antioxidant, an age resister and the like are added thereto, if necessary.

In contrast with this, usually known as a conventional thermoplastic adhesive are EVAs comprising an ethylene vinyl acetate resin as a base, polyamides comprising a polyamide resin as a base and elastomers comprising a thermoplastic rubber such as a styrene base block polymer as a base. However, they fall outside the scope of the first invention, and the reason why they are not suitably used is due to the solvent having the characteristic described above to a large extent.

That is, a) EVAs and polyamides have a large amount of moisture absorbed by the materials themselves, and the ink principal solvent having the characteristic described above in the present invention has a high hygroscopic property. Accordingly, the thermoplastic adhesive protecting the point of a tip absorbs moisture after installed, and the moisture is absorbed in the ink principal solvent, which leads to deterioration in the ink with the passage of time.

Also, b) apart from a), the ink principal solvent used in the present invention is liable to be extracted by a thermoplastic adhesive such as EVAs, and therefore the solvent extracted to a point of the sealing coat by the adhesive plasticizes the resin, whereby moisture absorption from the outside is increased. This makes it easy to enhance the viscosity at the point of the tip and break the ink.

Further, c) the elastomers have a low hygroscopic property unlike EVAs and the like. Also, they assume a strong tacking property after installed unlike three kinds of the other ones. This tacking property brings about the trouble that the pen bodies are adhered to each other when they are brought into contact after mounted.

In light of a) to c) described above, the olefin base thermoplastic adhesive which has a low hygroscopic property and is less liable to extract the ink solvent used in the first invention and which can surely form a sealing coat at the point of the tip is preferably used in terms of the performance. It is advantageous in terms of production because of a low tacking property unlike the elastomers and exhibits the effects of the present invention. Also, more preferably used is the thermoplastic sticking agent (or adhesive) satisfying the following characteristics (softening point and melt viscosity) as physical properties which are required in terms of operation.

In the first invention, the olefin base thermoplastic sticking agent used as the volatilization-inhibiting seal member has more preferably a softening point of 80° C. or higher and 180° C. or lower.

A measuring method of the above softening point is based on JIS K 6863-1994. If the softening point is lower than 80° C., the thermoplastic sticking agents mounted at the point of the tip are likely to be adhered or fused to each other or other parts they are brought into contact with after finishing the work. On the other hand, if the softening point is too high exceeding 180° C., temperature required for melting has to be very high, and large damage is caused to the ink present in the vicinity of the tip, which leads to breakage of the ink. Further, oxidation of the thermoplastic sticking agent is induced.

As can be found from the above, the olefin base thermoplastic sticking agent used as the volatilization-inhibiting seal member has a softening point of preferably 80° C. or higher and 180° C. or lower, more preferably 90° C. or higher and 170° C. or lower.

The olefin base thermoplastic sticking agent which is the volatilization-inhibiting seal member used in the first invention has preferably a melt viscosity falling in a range of 300 mPa.s or more and 20,000 mPa.s or less in terms of a viscosity observed when molten in a range of 140 to 200° C.

A measuring method of the melt viscosity is based on JIS K 6862-1984. If the melt viscosity is less than 300 mPa.s in the viscosity range described above, it is difficult to form a droplet and mount it at the point of the tip. On the other hand, if the value of the melt viscosity is too high exceeding 20,000 mPa.s, spinning action is caused after mounting the sealing coat, so that it is hard to be taken out in the form of a droplet. In addition thereto, the sticking agent showing a starch syrup-like spinning phenomenon is likely to be brought into contact with the other materials, and therefore the phenomenon is not preferred in handling. Accordingly, the sticking agent having such a high melt viscosity can not help being further heated to elevate the temperature. When aiming at the effect that the viscosity is reduced by raising the temperature to improve handling, large damage is given to the ink which is present as well in the vicinity of the tip, which leads to breakage of the ink. Further, oxidation of the thermoplastic sticking agent is induced.

As can be found from the above, the olefin base thermoplastic sticking agent has a melt viscosity falling in a range of preferably 300 mPa.s or more and 20,000 mPa.s or less, more preferably 300 mPa.s or more and 10,000 mPa.s or less in terms of a viscosity observed when molten in a range of 140 to 200° C.

In the first invention, the sealing coat constituted from the olefin base thermoplastic sticking agent having the characteristic described above which is the volatilization-inhibiting seal member can be formed at the point of the tip by a method in which the point part of the tip is dipped in a molten liquid prepared by melting the olefin base thermoplastic sticking agent having the characteristic described above and then immediately pulled up to solidify it by drying at room temperature or by heating. The shape and the like of the sealing coat formed at the point part of the tip shall not specifically be restricted as long as the effects of the present invention are exhibited and the above sealing coat is liable to be readily peeled off with a finger and the like at the time of using the oil-based ink ballpoint pen.

Next, the specific embodiments of the refill for an oil-based ink ballpoint pen of the present invention shall be explained in further details with reference to FIG. 1, FIG. 2, FIG. 3 and FIG. 4.

Figure 1:
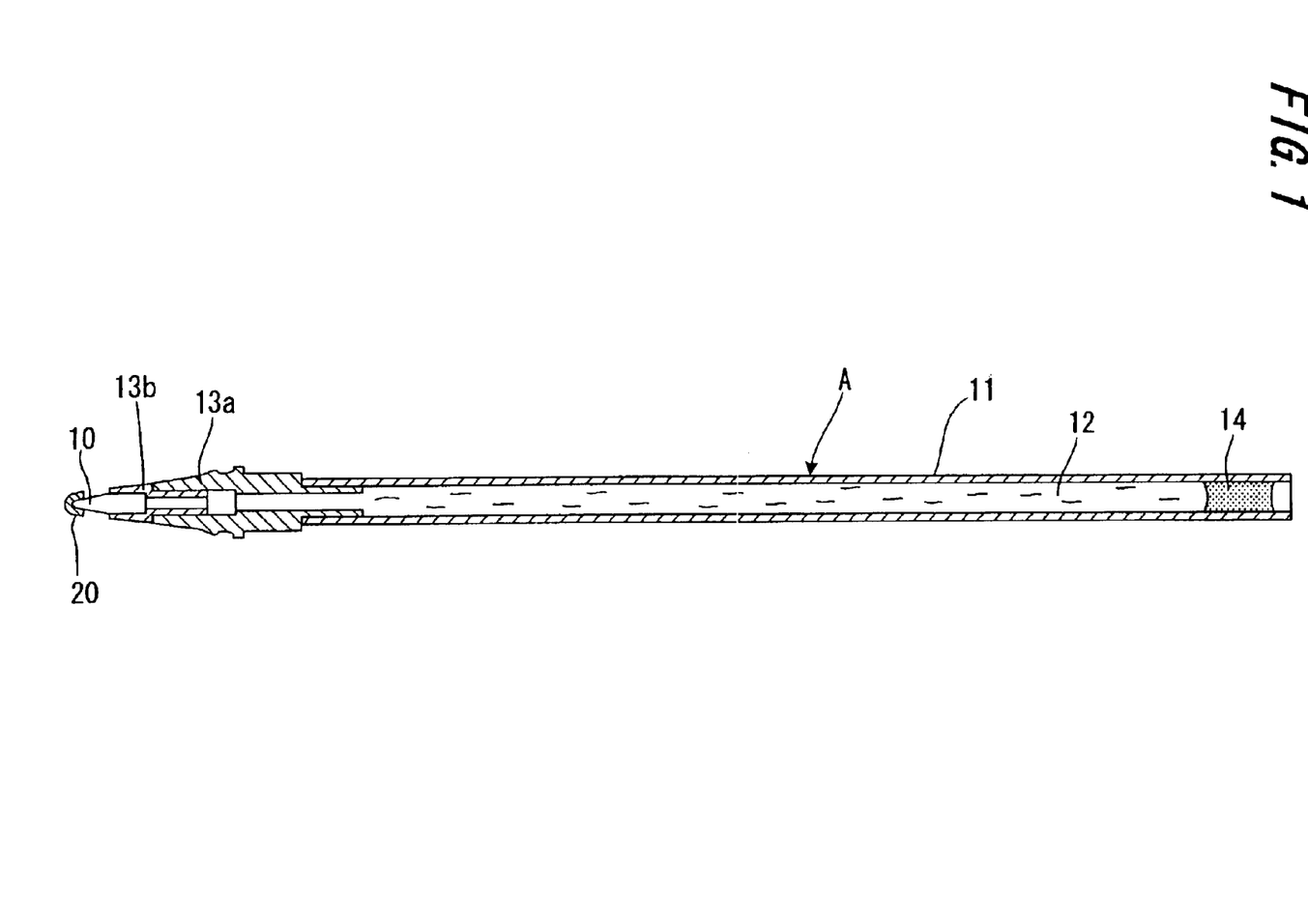
FIG. 1 is a partial vertical cross-sectional drawing showing one example of the embodiment of the refill for an oil-based ink ballpoint pen of the first invention.

FIG. 1 is a vertical cross-sectional drawing showing one example of the embodiments of the refill for an oil-based ink ballpoint pen of the present invention.

This refill A for a ballpoint pen has a resin-made (or metal-made) ink reservoir 11 equipped with a ballpoint pen tip 10 at a point. Also, 12 is a volatile oil-based ink containing a solvent having the characteristic described above, which is charged into the ink reservoir; 13a is a front holder member which is a joint member connected with the ink reservoir 11; 13b is a tip joint member connecting the tip 10 which is a pen point part with the front holder part 13a; and 14 is an ink follower.

Figure 2:
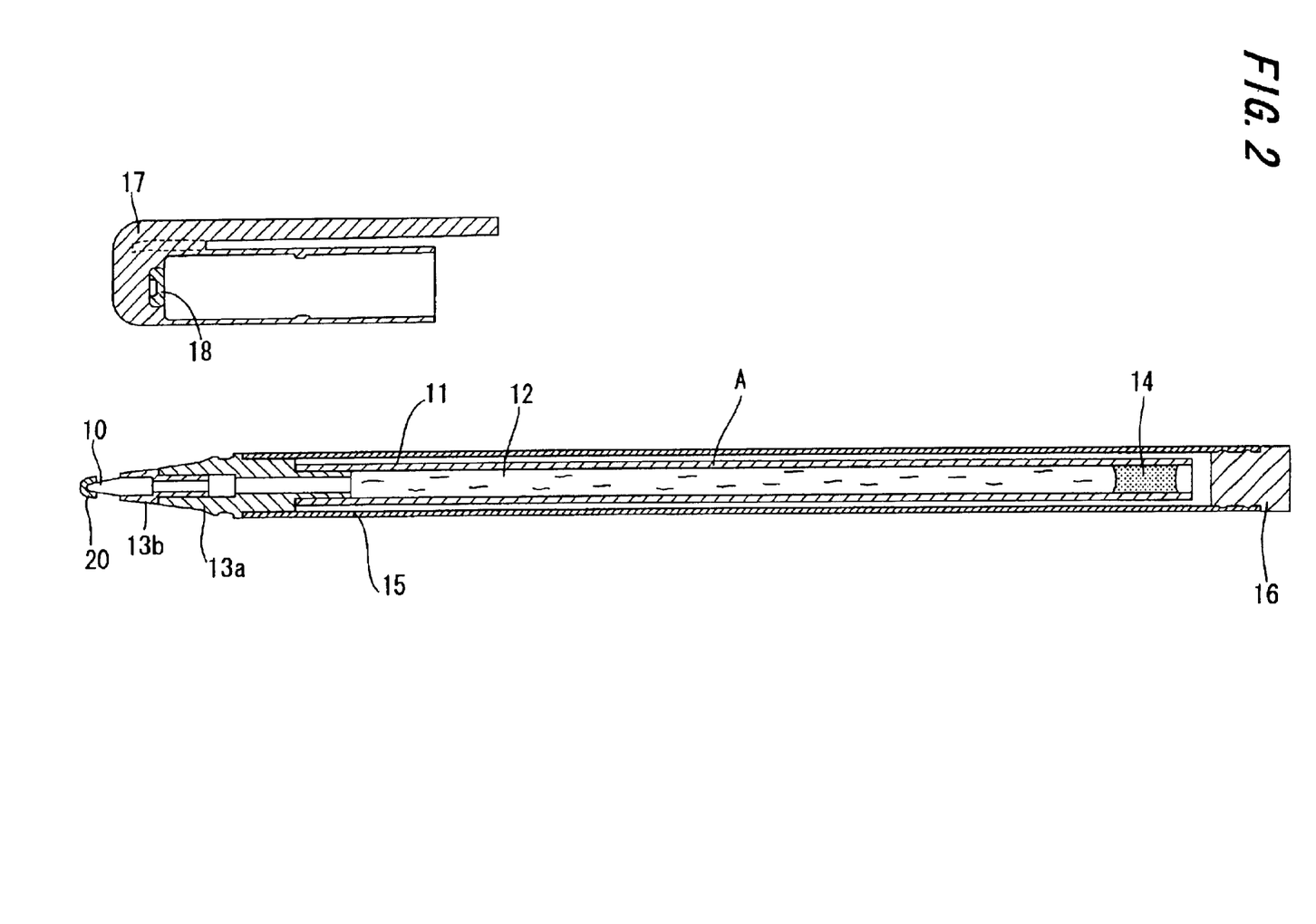
FIG. 2 is a vertical cross-sectional drawing showing one example of an oil-based ink ballpoint pen equipped with a cap using the refill for an oil-based ink ballpoint pen shown in FIG. 1.

The number 20 is a sealing coat which is formed at the point part of the tip 10 and which is a volatilization-inhibiting seal member obtained by solidifying a molten olefin base thermoplastic sticking agent. The refill for an oil-based ink ballpoint pen of the first invention is connected to a barrel 15, as shown in FIG. 2, and used in the form of an oil-based ink ballpoint pen of a cap type or used for exchange thereof. In FIG. 2, 16 is a plug; 17 is a cap member; and 18 is a sealing rubber constituted of a butyl rubber which seals the point part of the tip when mounting the cap member 17 onto the tip side.

Figure 3:
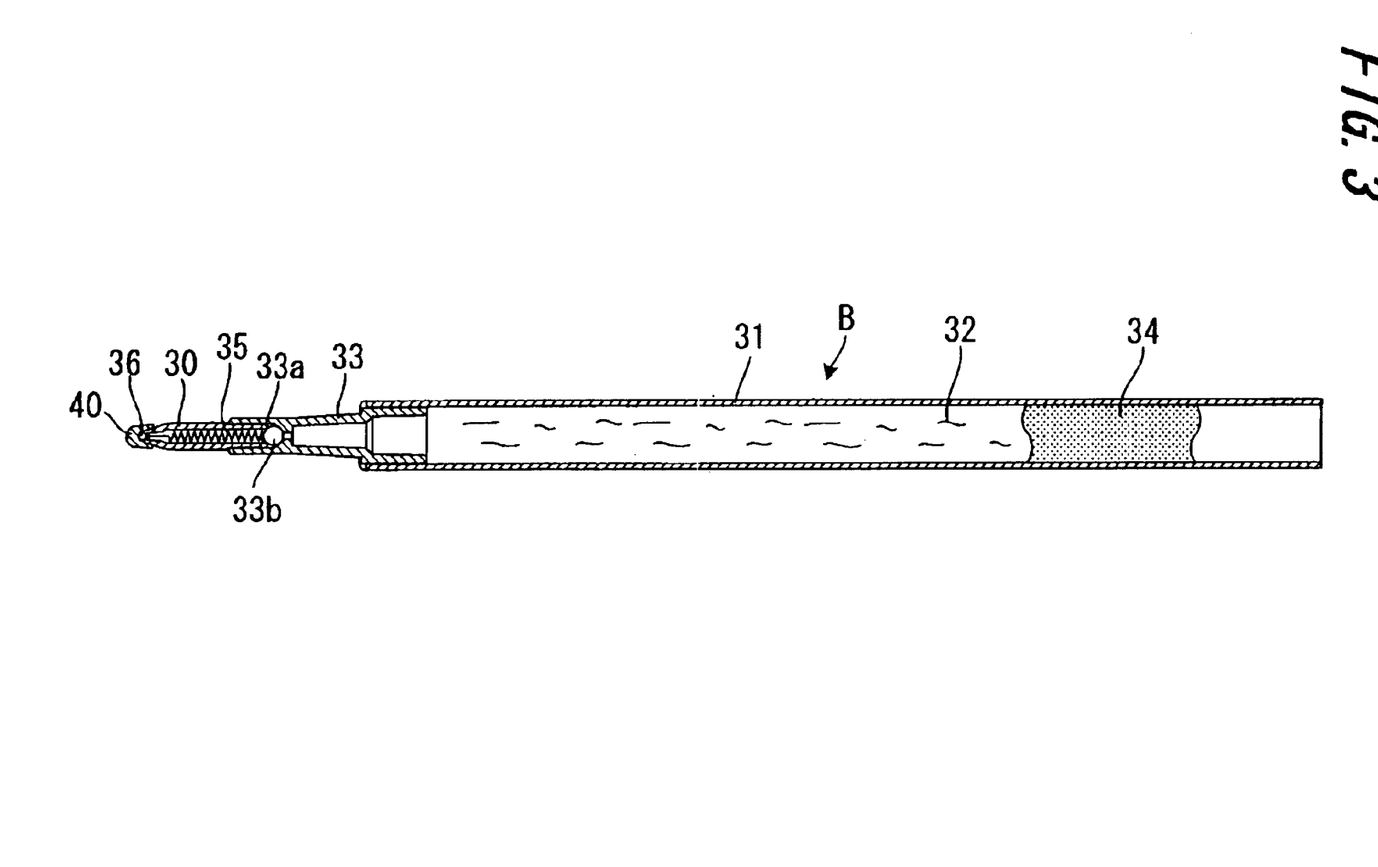
FIG. 3 is a partial vertical cross-sectional drawing showing another example of the embodiment of the refill for an oil-based ink ballpoint pen of the first invention.

FIG. 3 is a vertical cross-sectional drawing showing another example of the embodiments of the refill for an oil-based ink ballpoint pen of the present invention.

This refill B for a ballpoint pen has a resin-made (or metal-made) ink reservoir 31 equipped with a ballpoint pen tip 30 at a point. Also, 32 is a volatile oil-based ink containing a solvent having the characteristic described above, which is charged into the ink reservoir; 33 is a front holder member which is a joint member connected with the ink reservoir 31; and 34 is an ink follower. A spring 35 is inserted into the tip 30 and presses a rear end of a ball 36 rotatably held at the point part of the tip with a front part of the spring 35, and the refill is constituted so that the ball 36 is brought into tight contact with an inside of a ball holding part in the tip to prevent the ink from leaking. Also, a valve chamber 33a is provided in the front holder member 33; a tapered or spherical ball-receiving seat is provided at a rear part of the valve chamber 33a, and a ball valve 33b is movably fitted in the valve chamber 33a; when the tip 30 is turned upward, the ball valve 33b is brought into tight contact with the ball-receiving seat to close a guide hole, whereby an ink 32 is prevented from back-leaking; and when the tip 30 is turned downward, a closed state is released to allow the ink 32 to flow into the tip 30.

Figure 4:
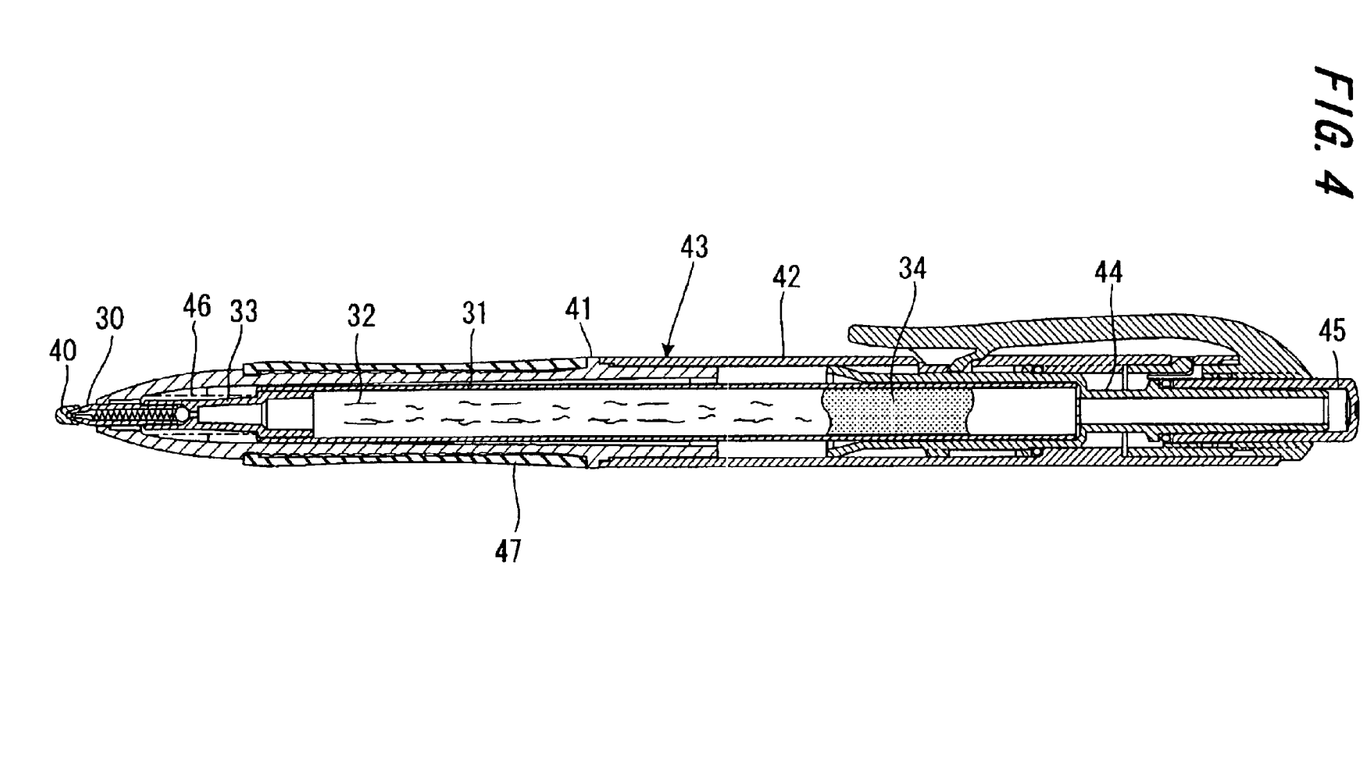
FIG. 4 is a vertical cross-sectional drawing showing one example of a knock type oil-based ink ballpoint pen using the refill for an oil-based ink ballpoint pen shown in FIG. 3.

The number 40 is a sealing coat which is formed at the point part of the tip 30 and which is a volatilization-inhibiting seal member obtained by solidifying a molten olefin base thermoplastic sticking agent. The refill for an oil-based ink ballpoint pen of the first invention is connected to a barrel 43 having a front barrel 41 and a rear barrel 42, as shown in FIG. 4, and used in the form of an oil-based ink ballpoint pen of a knock type or used for exchange thereof. The structure of the oil-based ink ballpoint pen of a knock type shown in FIG. 4 is described in, for example, Japanese Patent Application Laid-Open No. 205697/2003. The number 44 shown in FIG. 4 is a rotator for pushing out the refill forward; 45 is a knock bar; 46 is a spring of a coil type for return of the refill; and 47 is a grip member.

The reason why the refill for an oil-based ink ballpoint pen of the first invention exhibits the effects described above bases on the principal ink solvent having the characteristic described above which is used in the present invention to a large extent. In respect to the thermoplastic sticking agent of an EVA base and a polyamide base, the materials themselves have a high moisture absorbing amount as compared with the volatilization-inhibiting seal member used in the first invention, for example, the olefin base thermoplastic sticking agent, and the principal ink solvent has a high hygroscopic property. Accordingly, the thermoplastic sticking agent protecting the point of the tip absorbs moisture after mounted, and the moisture is absorbed in the principal ink solvent, which leads to deterioration in the ink with passage of time, or to talk about another influence, because the principal ink solvent used is liable to be extracted by the thermoplastic sticking agent of an EVA base, the solvent extracted by the sticking agent mounted plasticizes the resin, whereby a property of absorbing moisture from the outside is increased. This makes it easy to raise the viscosity at the point of the tip and break the ink. In addition thereto, the elastomers have a low hygroscopic property unlike EVA and the like, but they assume a strong tacking property after mounted unlike three kinds of the other ones. This tacking property brings about the trouble that the pen bodies are adhered to each other when they are brought into contact after mounted.

Thus, it becomes possible in the first invention to provide the refill for an oil-based ink ballpoint pen having the excellent effect that it is possible to surely form a volatilization-inhibiting seal member having a low hygroscopic property and less liable to extract the ink solvent at the point part of the tip, for example, a sealing coat constituted of an olefin base thermoplastic sticking agent and that it is advantageously produced because of a low tacking property unlike that of the elastomers.

Next, the oil-based ink ballpoint pen of the second invention is characterized in that it is equipped with a refill for an oil-based ink ballpoint pen charged with the volatile oil-based ink having the characteristic described above and a cap main body which is detachable to the tip side of the refill for an oil-based ink ballpoint pen and which has a volatilization-inhibiting seal member in an inside thereof, wherein the volatilization-inhibiting seal member is formed so that it covers the point of the tip when the cap main body is mounted on the tip side of the ballpoint pen main body.

In the second invention, the volatilization-inhibiting seal member includes, for example, ones constituted from a rubber selected from a butyl rubber (IIR) and an ethylene propylene rubber (EPM, EPDM).

In the oil-based ink ballpoint pen of the second invention, the volatile oil-based ink charged into the refill for an oil-based ink ballpoint pen is the same as the volatile oil-based ink described in details in the first invention described above, and therefore the explanations thereof shall be omitted.

In the second invention, the structure of the refill (ballpoint pen main body) for an oil-based ink ballpoint pen shall not specifically be restricted and includes, for example, a refill in which provided is an ink reservoir capable of being charged with a volatile oil-based ink having the characteristic described above and has a ballpoint pen tip member which comprises a pen point at the point of the ink reservoir and a writing instrument body of a sliver type in which a pen point is a ballpoint pen type.

In the second invention, when the refill for a ballpoint pen is charged with the oil-based ink having the characteristic described above, an ink follower is preferably charged into a rear end part of the oil-based ink. The solvent used has the characteristic described above and is volatile, and therefore the ink follower is charged in order to prevent volatilization, moisture absorption and ink leaking.

The ink follower which can be used is the same as the ink follower described in details in the first invention described above, and therefore the explanations thereof shall be omitted.

In the second invention, the shape, the structure and the like of the volatilization-inhibiting seal member shall not specifically be restricted as long as it has a structure in which the cap main body is detachable to the tip side of the refill (ballpoint pen main body) for an oil-based ink ballpoint pen and has the volatilization-inhibiting seal member in an inside thereof, wherein the volatilization-inhibiting seal member described above is formed so that it covers the point of the tip when the cap main body is mounted on the tip side of the ballpoint pen main body. The material of the volatilization-inhibiting seal member in the cap main body includes, for example, a rubber selected from a butyl rubber (IIR) and an ethylene propylene rubber (EPM, EPDM).

In the second invention, the butyl rubber (IIR) used for the volatilization-inhibiting seal member described above is a rubber which is obtained by copolymerizing isobutylene with a small amount of isoprene at a ultra low temperature and which has a very low unsaturation degree and has a low gas permeability as the largest feature thereof. Various grades of the butyl rubber (IIR) can be used, and the rubber having an unsaturation degree (isoprene amount) of 3 to 5% is preferably used. Further, a chlorinated butyl rubber (CIIR) and a brominated butyl rubber (BIIR) can be used as well.

The ethylene propylene rubber (EPM, EPDM) used for the volatilization-inhibiting seal member described above includes a copolymer of ethylene and propylene and a terpolymer of ethylene, propylene and a small amount of a diene component, and it is a non-diene base non-polar rubber having a characteristic which is very similar to that of a IIR rubber.

Rubbers having a Shore A hardness falling in a range of preferably 20 to 50, more preferably 30 to 45 are used as the rubbers constituting the above sealing members from the viewpoint of a rebound resilience force of the sealing rubber set in the cap.

In general, the IIR rubber has a Shore A hardness of 70 or more in many cases, and in order to control the rubber hardness to a range of 20 to 50 described above (more preferred range of 30 to 45), a suitable plasticizer (mineral oil, polybutene and the like) is used in a way that the effects of the present invention are not damaged.

Among the above rubbers, the IIR rubber is particularly preferably used. This is considered not only that the IIR rubber is effective for preventing the solvent having the characteristic described above from volatilizing, but also that it has an effect derived from the structure itself thereof. That is, the IIR rubber is, as described above, a copolymer of isobutylene and a small amount of isoprene, and particularly the solvent represented by Formula (I) is an isoprene base solvent and has high affinity to the IIR rubber. Also, it is estimated that an alcoholic hydroxyl group endowed to the solvent provides the rubber with durability to the solvent, and therefore the rubber is not much swollen. Further, it is estimated that the above affinity allows an ink-solidified matter at the point of the tip to stick to a IIR rubber side, so that it becomes possible to inhibit starving at the beginning of writing and make the writing feeling soft and smooth.

The reason why the above effect is exhibited in the second invention is that the solvent used and the rubber member used for the sealing member at the pen point have characteristics. Further, the reason why the ink which inhibits starving at the beginning of writing and which is excellent in soft and smooth writing feeling can be discharged is that the structure of the IIR rubber and the ink principal solvent used have characteristics.

In the second invention, the oil-based ink prepared using the solvent having the characteristic described above has an ink-dried and solidified matter formed at the point part of the tip after writing. The above solidified matter prevents the ball from rotating in rewriting to cause starving at the beginning of writing. NBR which is used as a sealing rubber for a water-based ink ballpoint pen in many cases does not have smoothness at the beginning of writing, which is endowed to the IIR rubber. That is, this is due to the fact that exerted to a large extent is not only a volatilization-preventing effect of the IIR rubber but also the effect that the ink-solidified matter is transferred onto a IIR rubber side to recover a clean surface on the point of the tip by virtue of affinity between the isoprene base rubber such as the IIR rubber and the ink solvent when the pen point gets into the rubber. Accordingly, not only the solvent is prevented from volatilizing, but also starving at the beginning of writing is improved in the present invention, so that it has become possible to provide an oil-based ink ballpoint pen which is excellent in making writing feeling soft and smooth.

Figure 5:
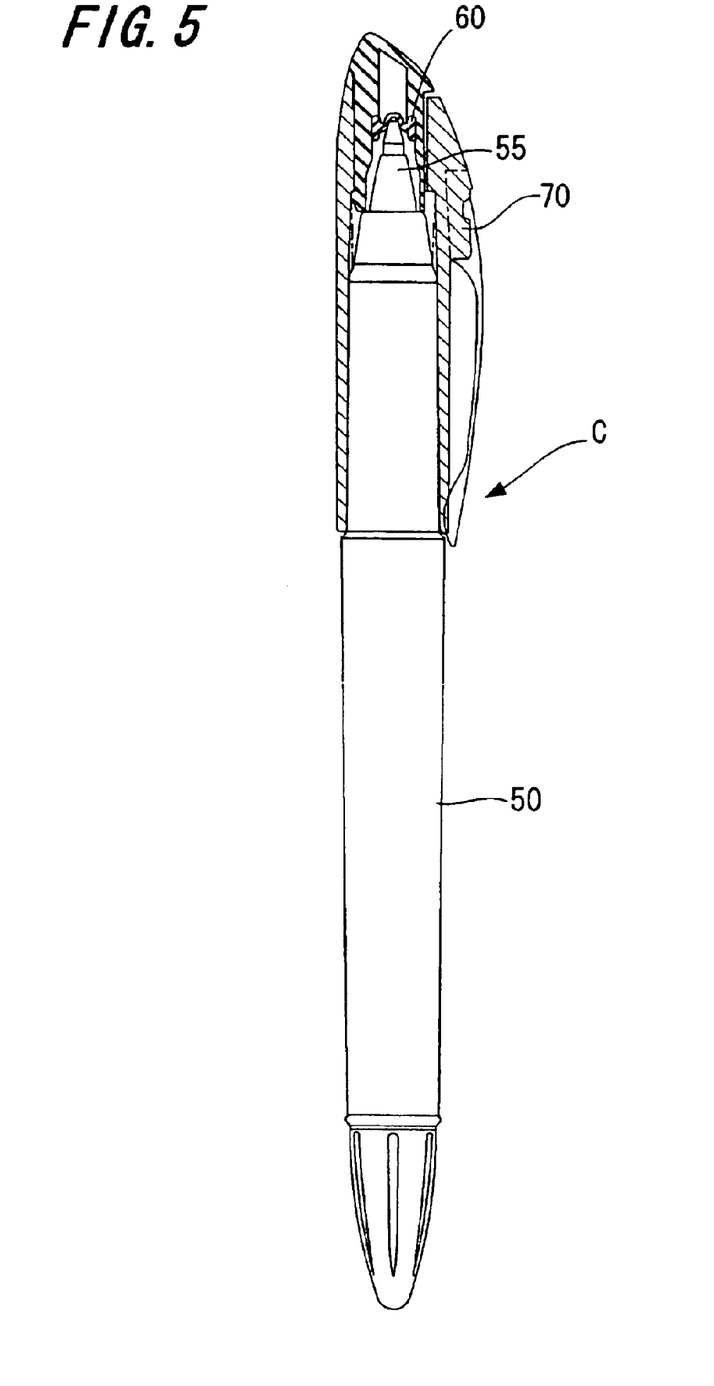
FIG. 5 is a partial vertical cross-sectional drawing showing one example of the embodiment of the oil-based ink ballpoint pen of the second invention.
Figure 6:
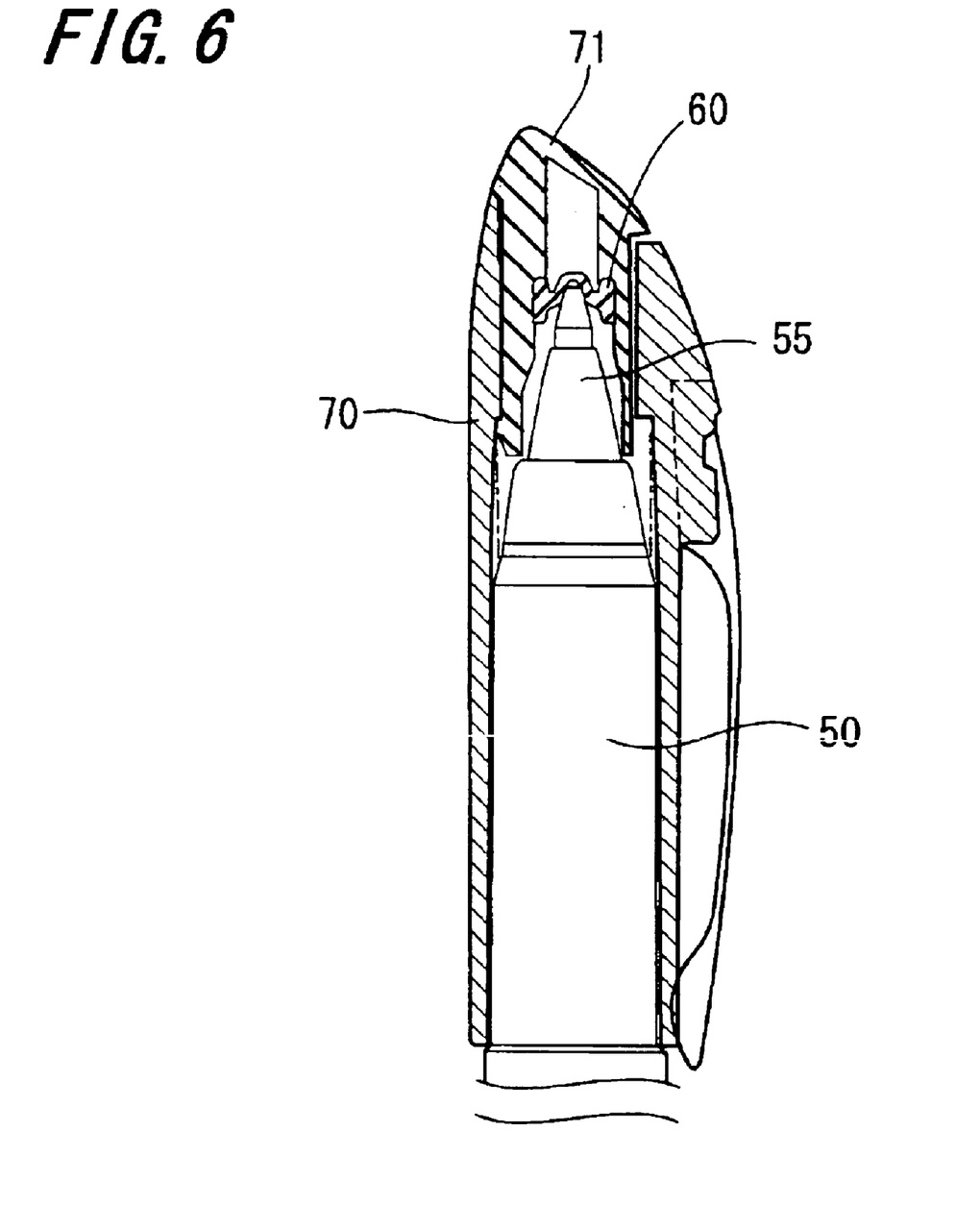
FIG. 6 is a partial vertical cross-sectional drawing showing an essential part of the second invention.
Figure 7:
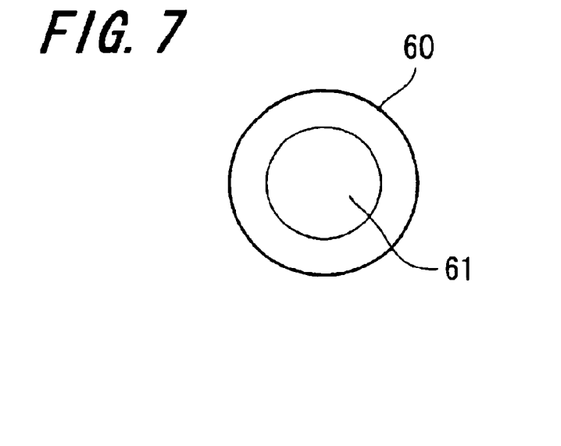
FIG. 7 is a plane drawing of the volatilization-inhibiting seal member in the cap main body.
Figure 8:
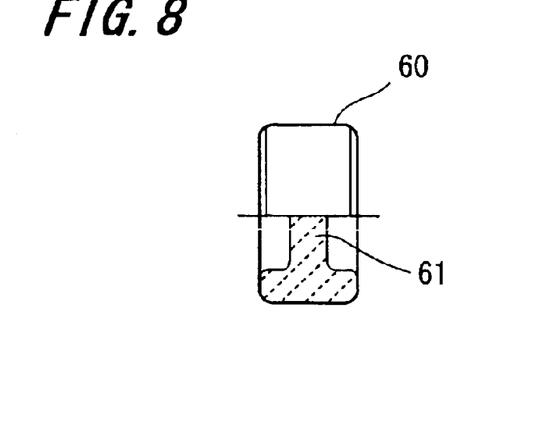
FIG. 8 is a partial vertical cross-sectional drawing of the volatilization-inhibiting seal member in the cap main body.
Figure 9:
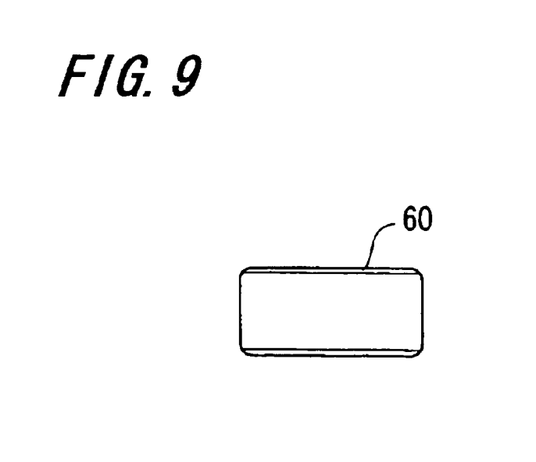
FIG. 9 is a side view of the volatilization-inhibiting seal member in the cap main body.

FIG. 5 to FIG. 9 show one example of the embodiments of the oil-based ink ballpoint pen of the present invention; FIG. 5 is a partial vertical cross-sectional drawing of the oil-based ink ballpoint pen of the present invention; FIG. 6 is a partial vertical cross-sectional drawing showing an essential part of the present invention; and FIG. 7 to FIG. 9 are a plane drawing, a partial vertical cross-sectional drawing and a side view of the volatilization-inhibiting seal member in the cap main body.

The oil-based ink ballpoint pen C of the present embodiment is, as shown in FIG. 5 to FIG. 9, equipped with a refill 50 for an oil-based ink ballpoint pen charged with a volatile oil based ink containing the solvent having the characteristic described above in an amount of 50% by weight or more based on the total solvents and a cap main body 70 detachable to a tip 55 side of the above refill 50 for a ballpoint pen and having a volatilization-inhibiting seal member 60 in an inside thereof.

The seal member 60 described above is formed in the above cap main body 70 so that it covers the point of the tip 55 when mounted on the tip 55 side of the refill 50 for a ballpoint pen. The whole outline shape of the above seal member 60 is circular as shown in FIG. 7 to FIG. 9, and the seal member 60 has a seal part 61 which is a step part in an inside thereof and is constituted so that the tip 55 point is covered by virtue of an elasticity of the seal member 60 when the cap main body 70 is mounted on the tip 55 side of the refill 50 for a ballpoint pen.

The seal member 60 in the above cap main body 70 is constituted from a rubber selected from a butyl rubber (IIR) and an ethylene propylene rubber (EPM, EPDM), and it is preferably constituted from a rubber selected from a butyl rubber (IIR) and an ethylene propylene rubber (EPM, EPDM) each having a Shore A harness falling in a range of 20 to 50. A symbol 71 shown in the drawing is a molded member which comprises PP (or PET) and is pressed into the cap main body 70.

The oil-based ink ballpoint pen of the second invention thus constituted inhibits the solvent from volatilizing from the pen point and, in addition thereto, inhibits starving at the beginning of writing, and it is excellent in making writing feeling soft and smooth.

EXAMPLES

Next, the present invention shall be explained in further details with reference to examples and comparative examples, but the present invention shall not be restricted to the examples described below.

Examples 1 to 2 and Comparative Examples 1 to 12, First Invention

Thermoplastic sticking agents 1 to 7 described below were used as the volatilization-inhibiting seal member. A solvent for evaluation and an ink for evaluation having the following compositions were used.
Thermoplastic Sticking Agents:
Olefin base-1 (XH254-1, manufactured by Hitachi Kasei Polymer Co., Ltd., softening point: 150° C., melt viscosity: 1000 mPa.s/180° C.)
Olefin base-2 (XH850-2, manufactured by Hitachi Kasei Polymer Co., Ltd., softening point: 150° C., melt viscosity: 1500 mPa.s/180° C.)
3. EVA base-1 (XH638-1P, manufactured by Hitachi Kasei Polymer Co., Ltd., softening point: 100° C., melt viscosity: 900 mPa.s/180° C.)
4. EVA base-2 (XH002-1, manufactured by Hitachi Kasei Polymer Co., Ltd., softening point: 115° C., melt viscosity: 2000 mPa.s/140° C.)
5. Elastomer base-1 (Hi-bon 9732, manufactured by Hitachi Kasei Polymer Co., Ltd., softening point: 70° C., melt viscosity: 2000 mPa.s/150° C.)
6. Elastomer base-2 (Hi-bon 9612, manufactured by Hitachi Kasei Polymer Co., Ltd., softening point: 88° C., melt viscosity: 3000 mPa.s/160° C.)
7. Polyamide base (Hi-bon 9380, manufactured by Hitachi Kasei Polymer Co., Ltd., softening point: 110° C., melt viscosity: 3000 mPa.s/150° C.)
Solvents for Evaluation:
Solvent 1: 3-methoxy-3-methyl-1-butanol
Solvent 2: dipropylene glycol dimethyl ether
Inks for Evaluation (Blend Unit: % by Weight, Total Amount: 100% by Weight):

| Ink 1 for evaluation: | |
|---|---|
| Spilon Violet C-RH (manufactured by Hodogaya Chemical Co., Ltd. | 8.0 |
| Spilon Yellow C-GNH (manufactured by Hodogaya Chemical Co., Ltd.) | 5.0 |
| Printex #35 (manufactured by Degussa AG.) | 8.0 |
| Polyvinylbutyral BL-1 (manufactured by Sekisui Chemical Co., Ltd.) | 4.0 |
| Hilac 110H (manufactured by Hitachi Chemical Co., Ltd.) | 12.0 |
| Phosphoric acid ester: Phosphanol LB 400 | 1.46 |
| Amine base compound: Polyoxyethylene oleylamine (TAMNO-5) | 1.04 |

-continued

Ink 1 for evaluation:

| | |
|---|---|
| 3-Methoxybutanol | 5.0 |
| 3-Methoxy-3-methyl-1-butanol | 55.5 |

Ink 2 for Evaluation:

| | |
|---|---|
| Spilon Yellow C-GNH (manufactured by Hodogaya Chemical Co., Ltd.) | 15.0 |
| Hilac 111 (manufactured by Hitachi Chemical Co., Ltd.) | 20.0 |
| Dipropylene glycol dimethyl ether | 65.0 |

The thermoplastic sticking agents, the solvents and the ink compositions which were prepared above were combined as shown in the following Table 1, and they were evaluated for a swelling property, starving caused by moisture absorption, a starving property and a tacking property by the following respective evaluation methods. The evaluation results thereof are shown in the following Table 1.

Evaluation Method of Swelling Property:

A weight of the respective thermoplastic sticking agents was measured, and the respective thermoplastic sticking agents were entered in a 10 ml glass bottle containing the solvent for evaluation. Next, the glass bottle was tightly stoppered and left standing at 50° C. for 3 days, and then the weights thereof were measured again to determine a swelling rate. As described above, the weight change rate was calculated from the initial weight and the weight after the passage of time, and the degree of the swelling rate was evaluated according to the following evaluation criteria.

Evaluation Criteria:
○: swelling rate is less than 5.00%
Δ: swelling rate is 5.00% or more to less than 7.50%
X: swelling rate is 7.50% or more Evaluation Method of Starving Caused by Moisture Absorption:

The respective thermoplastic sticking agents were molten with heating, and a point part of a tip, of a refill charged with the ink for evaluation was dipped therein. Thereafter, it was pulled up and left standing at 50° C. and 80% for 7 days, and then it was detached and subjected to spiral writing on PPC paper. In this case, the state at the beginning of writing was observed.

A form in which a metal-made ink reservoir (SJP-10, manufactured by Mitsubishi Pencil Co., Ltd.) was pressed into a metal tip having a ball of a diameter of 1.0 mm was used as the form of the refill. A solvent volatilization-preventing body having the following composition was used for preventing volatilization of the solvent at a rear end part thereof.

Blend Composition of Volatilization-Preventing Body (ink Follower):

Polybutene 2000H (manufactured by Idemitsu Petrochemical Co., Ltd.) 100% by weight was used.

Evaluation Criteria:
○: starving at the beginning of writing is caused within one cycle after detached
Δ: starving at the beginning of writing is caused within 2 to 5 cycles after detached
X: starving at the beginning of writing is caused in 6 or more cycles after detached Evaluation Method of Starving Property:

The same operation as in the evaluation method of starving caused by moisture absorption described above was carried out at 50° C. and 30% to evaluate a starving property according to the following evaluation criteria.

Evaluation Criteria:
○: starving at the beginning of writing is caused within one cycle after detached
Δ: starving at the beginning of writing is caused within 2 to 5 cycles after detached
X: starving at the beginning of writing is caused in 6 or more cycles after detached Evaluation Method of Tacking Property:

A solidified matter of the respective thermoplastic sticking agents was formed in the same manner as in the evaluation method of starving caused by moisture absorption, and then it was left standing at room temperature (25° C.) for one hour. Thereafter, the thermoplastic sticking agents were brought into contact with each other, and then they were separated again to evaluate the degree of separation according to the following evaluation criteria.

Evaluation Criteria:

TABLE 1

| | Example | | Comparative Example | | | | | | | | | | | |
|---|---|---|---|---|---|---|---|---|---|---|---|---|---|---|
| | 1 | 2 | 1 | 2 | 3 | 4 | 5 | 6 | 7 | 8 | 9 | 10 | 11 | 12 |
| Thermoplastic sticking agent | 1 | 2 | 3 | 4 | 5 | 6 | 7 | 1 | 2 | 3 | 4 | 5 | 6 | 7 |
| Solvent for evaluation | 1 | 1 | 1 | 1 | 1 | 1 | 1 | 2 | 2 | 2 | 2 | 2 | 2 | 2 |
| Ink for evaluation | 1 | 1 | 1 | 1 | 1 | 1 | 1 | 2 | 2 | 2 | 2 | 2 | 2 | 2 |
| Evaluation of swelling property | ○ | ○ | Δ | Δ | ○ | ○ | Δ | X | X | X | X | Δ | Δ | ○ |
| Evaluation of starving caused by moisture absorption | ○ | ○ | Δ | Δ | Δ | Δ | X | X | X | X | X | X | X | X |
| Evaluation of starving property | ○ | ○ | X | X | Δ | Δ | X | X | X | X | X | X | X | X |
| Evaluation of tacking property | ○ | ○ | Δ | ○ | X | X | ○ | ○ | ○ | Δ | ○ | X | X | ○ |

○: unforcedly separated in a normal manner
Δ: tacking property is felt a little
X: not separated as if adhered As apparent from the results shown in Table 1 described above, it has become clear that in Examples 1 to 2 falling in the scope of the first invention in comparison with Comparative Examples 1 to 12 falling outside the scope of the first invention, swelling is not caused and starving is not brought about by moisture absorption and a tacking property is not observed. Accordingly, it has become clear that the refills for an oil-based ink ballpoint pen prepared according to the first invention prevent volatilization as well as starving at the beginning of writing and that they are excellent in making writing feeling soft and smooth.

Examples 3 to 4 and Comparative Examples 13 to 20, Second Invention

Rubbers 1 to 6 described below were used as the volatilization-inhibiting seal member (sealing rubber). The same solvents 1 and 2 for evaluation and inks 1 and 2 for evaluation as in the examples of the first invention described above were used as the solvent for evaluation and the ink for evaluation.
Kind of Rubbers:
Rubber 1: ethylene propylene rubber (EPDM, Shore A hardness: 35)
Rubber 2: butyl rubber (IIR, Shore A hardness: 40)
Rubber 3: acrylonitrile butadiene rubber (NBR, Shore A hardness: 40)
Rubber 4: silicone rubber (Q, Shore A hardness: 30)
Rubber 5: fluorinated rubber (FKM, Shore A hardness: 70)

The rubbers, the solvents and the ink compositions which were prepared above were combined as shown in the following Table 2, and they were evaluated for a swelling property, prevention of volatilization and starving at the beginning of writing by the following respective evaluation methods. The evaluation results thereof are shown in the following Table 2.
Evaluation Method of Swelling Property:

A weight of the respective rubbers was measured, and the respective rubbers were dipped in a 10 ml glass bottle containing the solvent for evaluation. The glass bottle was tightly stoppered and left standing at 50° C. for 3 days, and then the weights thereof were measured again to determine a swelling rate.

As described above, the weight change rate was calculated from the initial weight and the weight after the passage of time, and the degree of the swelling rate was evaluated according to the following evaluation criteria.
Evaluation Criteria:
⊚: swelling rate is 1.00% or less
○: swelling rate is more than 1.00% to less than 2.00%
△: swelling rate is 2.00% to less than 3.00%
X: swelling rate is 3.00% or more In the second invention, the evaluation criteria for a swelling rate of the various sealing rubbers are set to such a severe level as less than 1% to 3% or more (4 degree evaluation) as compared with the evaluation criteria of less than 5% to 7.5% or more (3 degree evaluation) for a swelling rate of the sealing coats in the first invention. The sealing coat of the first invention has a principal purpose of protecting the pen point from immediately after production through a transportation stage, purchasing and using. The refill for an oil-based ink ballpoint pen which is covered with the sealing coat is further protected by a packaging material, and therefore the evaluation criteria of the swelling rate is set to less than 5% to 7.5% or more (3 degree evaluation). In contrast with this, in the second invention, a rib is present in the cap having the sealing rubber, and therefore dimensional restriction is severely required. Further, putting-on and taking-off are carried out many times in each use, so that the evaluation criteria of the swelling rate are set to such a severe level as less than 1% to 3% or more (4 degree evaluation). Further, if the swelling rate is high in the second invention, the cap is detached in a certain case, and therefore the criteria of the swelling rate are set to severe evaluation.
Evaluation Method of Preventing Volatilization:

The respective rubbers were cut to a size of an inner diameter of a 10 mml glass bottle, and the bottle was charged with the solvent for evaluation. Then, the cap of the rubber was pressed thereinto to measure the weight of the solvent and the total weight. Thereafter, the bottle was left standing at 50° C. for 3 days, and the weight was measured again. The solvent-permeating rate was determined according to the following equation to evaluate the degree of the solvent-permeating rate according to the following evaluation criteria.

$$\text{Solvent-permeating rate } (\%)=[(\text{total weight after the passage of time}-\text{initial total weight})/(\text{weight of solvent})]\times 100$$

Evaluation Criteria:
⊚: solvent-permeating rate is 1.00% or less
○: solvent-permeating rate is more than 1.00% to less than 2.00%
△: solvent-permeating rate is 2.00% to less than 3.00%
X: solvent-permeating rate is 3.00% or more
Evaluation Method of Starving at the Beginning of Writing:

The ballpoint pens based on FIG. 5 to FIG. 9 were used for the test, and the rubbers described above were used as the volatilization-inhibiting seal member. Used were the ballpoint pens having a polypropylene tube having an inner diameter of 1.60 mm and a stainless tip (a ball is made of hard metal and has a diameter of 1.0 mm).

The ballpoint pens were charged with each 0.2 g of the ink 1 or 2 for evaluation having the compositions described above, and the then characters of "Mitsubishi" were written on PPC paper every 30 minutes under the conditions of 25° C. and 65% . Writing was repeated five times, and then the starving degree of the characters was sensorily evaluated according to the following evaluation criteria.
Evaluation Criteria:

TABLE 2

|  | Example | | Comparative Example | | | | | | | |
| --- | --- | --- | --- | --- | --- | --- | --- | --- | --- | --- |
|  | 3 | 4 | 13 | 14 | 15 | 16 | 17 | 18 | 19 | 20 |
| Rubber | 1 | 2 | 3 | 4 | 5 | 1 | 2 | 3 | 4 | 5 |
| Solvent for evaluation | 1 | 1 | 1 | 1 | 1 | 2 | 2 | 2 | 2 | 2 |
| Ink for evaluation | 1 | 1 | 1 | 1 | 1 | 2 | 2 | 2 | 2 | 2 |
| Evaluation of swelling property | ○ | ○ | ○ | ⊚ | X | ○ | ○ | ○ | ⊚ | X |

TABLE 2-continued

|  | Example | | Comparative Example | | | | | | | |
|---|---|---|---|---|---|---|---|---|---|---|
|  | 3 | 4 | 13 | 14 | 15 | 16 | 17 | 18 | 19 | 20 |
| Evaluation of preventing volatilization | ○ | ⊙ | Δ | X | ⊙ | X | X | X | X | ⊙ |
| Evaluation of starving at the beginning of writing | ⊙ | ⊙ | X | X | X | X | X | X | X | X |

○: rotation of ball was smooth, and writing could be made without any problems
X: rotation of ball was not smooth, and scratching was observed in writing As apparent from the results shown in Table 2 described above, it has become clear that in Examples 3 to 4 falling in the scope of the second invention in comparison with Comparative Examples 13 to 20 falling outside the scope of the second invention, the refills prevent volatilization as well as starving at the beginning of writing and they are excellent in making writing feeling soft and smooth.

INDUSTRIAL APPLICABILITY

According to the first invention, provided is a refill for an oil-based ink ballpoint pen which can surely form a sealing coat at the point part of a tip and inhibits an ink solvent from absorbing moisture from the outside and volatilizing with the passage of time and which inhibits starving at the beginning of writing after transportation and storage, protects a pen point and is excellent in making writing feeling soft and smooth.

According to the second invention, provided is an oil-based ink ballpoint pen which inhibits starving at the beginning of writing as well as preventing a solvent from volatilizing from a pen point and which is excellent in making writing feeling soft and smooth.

What is claimed is:

1. A refill for an oil-based ink ballpoint pen prepared by charging a refill for a ballpoint pen equipped with a ballpoint pen tip at a point thereof with a volatile oil-based ink containing at least a solvent selected from the group consisting of alcohols, polyhydric alcohols and glycol monoethers each having a vapor pressure of 0.001 mm Hg or more at 25° C. and having no aromatic ring in a molecular in an amount of 50% by weight or more based on the total solvents, wherein a volatilization-inhibiting seal member is formed at the point part of the tip described above.

2. A refill for an oil-based ink ballpoint pen, wherein the volatilization-inhibiting seal member as described in claim 1 is a sealing coat obtained by melting and solidifying an olefin base thermoplastic sticking agent.

3. A refill for an oil-based ink ballpoint pen, wherein a solvent represented by the following Formula (I) is used as the glycol monoether as described in claim 1:

wherein $R^1$, $R^2$ and $R^3$ each are independently H or $CH_3$.

4. An oil-based ink ballpoint pen characterized in that it is equipped with a refill for an oil-based ballpoint pen charged with a volatile oil-based ink containing at least a solvent selected from the group consisting of alcohols, polyhydric alcohols and glycol monoethers each having a vapor pressure of 0.001 mm Hg or more at 25° C. and having no aromatic ring in a molecular in an amount of 50% by weight or more based on the total solvents and a cap main body which is detachable to the tip side of the above refill for an oil-based ink ballpoint pen and has a volatilization-inhibiting seal member in the inside thereof, wherein the volatilization-inhibiting seal member is formed so that it covers the point of the tip when the above cap main body is mounted on the tip side of the refill for an oil-based ink ballpoint pen.

5. An oil-based ink ballpoint pen, wherein the volatilization-inhibiting seal member as described in claim 4 is constituted from a rubber selected from the group consisting of butyl rubber (IIR) and an ethylene propylene rubber (EPM, EPDM).

6. An oil-based ink ballpoint pen, wherein a solvent represented by the following Formula (I) is used as the glycol monoether as described in claim 4:

wherein $R^1$, $R^2$ and $R^3$ each are independently H or $CH_3$.

* * * * *